United States Patent

Bergman

[11] Patent Number: 5,838,820
[45] Date of Patent: Nov. 17, 1998

[54] PATTERN RECOGNITION APPARATUS AND METHOD

[76] Inventor: Anthony J. Bergman, 2212 Cypress Point Dr. West, Clearwater, Fla. 34623

[21] Appl. No.: 846,597

[22] Filed: Apr. 30, 1997

[51] Int. Cl.[6] .......................... G06K 9/187; G06K 9/205; G06K 9/243

[52] U.S. Cl. ........................ 382/187; 382/205; 382/243

[58] Field of Search .................................. 382/177, 187, 382/205, 243, 298, 197, 198, 173, 176, 178, 179, 180, 203, 249, 127; 707/514

[56] References Cited

U.S. PATENT DOCUMENTS

| | | | |
|---|---|---|---|
| 4,805,223 | 2/1989 | Denyer | 382/127 |
| 5,048,099 | 9/1991 | Lee | 382/175 |
| 5,065,447 | 11/1991 | Barnsley | 382/249 |
| 5,701,369 | 8/1995 | Moon et al. | 382/249 |
| 5,717,788 | 4/1995 | Barnsley | 382/249 |
| 5,754,704 | 3/1995 | Barnsley et al. | 382/249 |
| 5,761,686 | 6/1998 | Bloomberg | 382/232 |
| 5,765,176 | 9/1998 | Bloomberg | 707/514 |

*Primary Examiner*—Joseph Mancuso
*Assistant Examiner*—Wasseem H. Hamdan
*Attorney, Agent, or Firm*—Ronald E. Smith

[57] ABSTRACT

A pattern recognition device has a drawing area upon which a user may draw an image with a pen designed for that purpose. In a first option available to the user, a user-drawn image is analyzed and saved in the memory of a computer. In a second option, the image is analyzed and an image in a pre-existing image database of the computer is retrieved which most nearly resembles the drawn image. In both options, the user-drawn image is transformed into a target image which is then subdivided into a plurality of image subdivisions and each image subdivision is then further subdivided into sectors. A first binary value is assigned to each sector to indicate whether or not it has at least some graphical data and a second binary value is assigned to indicate whether or not the graphical data occupies a predetermined percentage of the area of the sector. These binary values are strung together, converted into an integer, and the integers are stored in a computer memory. Since the strung together binary values represent images in compressed numerical form, when the same process is applied to other user-drawn images, the computer can retrieve an image from its memory that most nearly resembles the drawn image by selecting an image in its memory having the nearest numerical value to the drawn image.

12 Claims, 10 Drawing Sheets

| Shape-mate number | Direction Flags for: | | | | Density Flags for: | | | | Shape-mate Value (integer) |
|---|---|---|---|---|---|---|---|---|---|
| | S1 | S2 | S3 | S4 | S1 | S2 | S3 | S4 | |
| 1 | 0 | 0 | 0 | 0 | 0 | 0 | 0 | 0 | 0 |
| 2 | 1 | 0 | 0 | 1 | 1 | 0 | 0 | 1 | 153 |
| 3 | 0 | 0 | 0 | 0 | 0 | 0 | 0 | 0 | 0 |
| 4 | 0 | 0 | 0 | 0 | 0 | 0 | 0 | 0 | 0 |
| 5 | 0 | 0 | 1 | 1 | 0 | 0 | 0 | 0 | 48 |
| 6 | 1 | 0 | 1 | 1 | 1 | 0 | 0 | 1 | 185 |
| 7 | 0 | 0 | 1 | 1 | 0 | 0 | 0 | 0 | 48 |
| 8 | 0 | 0 | 0 | 0 | 0 | 0 | 0 | 0 | 0 |
| 9 | 1 | 1 | 0 | 0 | 0 | 0 | 0 | 0 | 192 |
| 10 | 1 | 1 | 0 | 1 | 1 | 0 | 0 | 1 | 217 |
| 11 | 1 | 1 | 0 | 0 | 0 | 0 | 0 | 0 | 192 |
| 12 | 0 | 0 | 0 | 0 | 0 | 0 | 0 | 0 | 0 |
| 13 | 0 | 0 | 0 | 0 | 0 | 0 | 0 | 0 | 0 |
| 14 | 1 | 0 | 0 | 1 | 1 | 0 | 0 | 1 | 153 |
| 15 | 0 | 0 | 0 | 0 | 0 | 0 | 0 | 0 | 0 |
| 16 | 0 | 0 | 0 | 0 | 0 | 0 | 0 | 0 | 0 |

*Fig. 4*

| SM # | Value |
|---|---|
| 1 | 0 |
| 2 | 0 |
| 3 | 238 |
| 4 | 255 |
| 5 | 0 |
| 6 | 34 |
| 7 | 255 |
| 8 | 238 |
| 9 | 34 |
| 10 | 255 |
| 11 | 136 |
| 12 | 0 |
| 13 | 255 |
| 14 | 136 |
| 15 | 0 |
| 16 | 0 |

Fig. 5A

| SM # | Value |
|---|---|
| 1 | 51 |
| 2 | 119 |
| 3 | 187 |
| 4 | 51 |
| 5 | 204 |
| 6 | 238 |
| 7 | 221 |
| 8 | 204 |
| 9 | 0 |
| 10 | 102 |
| 11 | 153 |
| 12 | 0 |
| 13 | 0 |
| 14 | 102 |
| 15 | 153 |
| 16 | 0 |

Fig. 5B

| SM # | Value |
|---|---|
| 1 | 119 |
| 2 | 221 |
| 3 | 0 |
| 4 | 0 |
| 5 | 255 |
| 6 | 17 |
| 7 | 0 |
| 8 | 0 |
| 9 | 68 |
| 10 | 255 |
| 11 | 17 |
| 12 | 0 |
| 13 | 0 |
| 14 | 68 |
| 15 | 255 |
| 16 | 17 |

*Fig. 5D*

| SM # | Value |
|---|---|
| 1 | 102 |
| 2 | 153 |
| 3 | 0 |
| 4 | 0 |
| 5 | 119 |
| 6 | 187 |
| 7 | 51 |
| 8 | 51 |
| 9 | 238 |
| 10 | 221 |
| 11 | 204 |
| 12 | 204 |
| 13 | 102 |
| 14 | 153 |
| 15 | 0 |
| 16 | 0 |

| L1 | L2 | L3 | L4 | L5 | L6 | L7 | L8 | L9 | L10 | L11 | L12 | L13 | L14 | L15 | L16 |
|---|---|---|---|---|---|---|---|---|---|---|---|---|---|---|---|
| (6,0) | 5,0 | (4,0) | (4,0) | 1,0 | 4,17 | 4,0 | (6,0) | 2,0 | 2,102 | 4,17 | (6,0) | (5,0) | 5,0 | (3,0) | (6,0) |
| 5,0 | 1,0 | 3,0 | 3,0 | 6,34 | 1,34 | 3,51 | 4,0 | 1,34 | 5,204 | 1,136 | 4,0 | 4,0 | 4,68 | 1,0 | 3,0 |
| 1,0 | 6,102 | 5,102 | 2,51 | (5,51) | 5,51 | 5,119 | 3,51 | 4,68 | (3,221) | 6,153 | 2,0 | 2,0 | 6,102 | 5,102 | 2,0 |
| 2,51 | 2,119 | 2,187 | 6,136 | 3,119 | (3,187) | 6,153 | 5,179 | (5,204) | 6,238 | 2,153 | 1,0 | 3,102 | 2,102 | 6,153 | 1,0 |
| 3,102 | (3,153) | 1,238 | 5,144 | 2,204 | 2,238 | 2,221 | 2,204 | 3,238 | 4,255 | (3,204) | 3,204 | 6,136 | 1,136 | 2,153 | 4,17 |
| 4,119 | 4,221 | 6,255 | 1,255 | 4,255 | 6,255 | 1,255 | 1,238 | 6,255 | 1,255 | 5,238 | 5,220 | 1,255 | (3,153) | 4,255 | 5,144 |

Fig. 6

| SM # | Value |
|---|---|
| 1 | 0 |
| 2 | 153 |
| 3 | 0 |
| 4 | 0 |
| 5 | 48 |
| 6 | 185 |
| 7 | 48 |
| 8 | 0 |
| 9 | 192 |
| 10 | 217 |
| 11 | 192 |
| 12 | 0 |
| 13 | 0 |
| 14 | 153 |
| 15 | 0 |
| 16 | 0 |

*Fig. 7*

| SM # | Index |
|---|---|
| 1 | 1 |
| 2 | 5 |
| 3 | 1 |
| 4 | 1 |
| 5 | 3 |
| 6 | 4 |
| 7 | 2 |
| 8 | 1 |
| 9 | 4 |
| 10 | 3 |
| 11 | 5 |
| 12 | 1 |
| 13 | 1 |
| 14 | 6 |
| 15 | 1 |
| 16 | 1 |

*Fig. 8*

| | L1 | L2 | L3 | L4 | L5 | L6 | L7 | L8 | L9 | L10 | L11 | L12 | L13 | L14 | L15 | L16 |
|---|---|---|---|---|---|---|---|---|---|---|---|---|---|---|---|---|
| | (7,0) | 5,0 | (7,0) | (7,0) | 1,0 | 4,17 | 4,0 | (7,0) | 2,0 | 2,102 | 4,17 | (7,0) | (7,0) | 5,0 | (7,0) | (7,0) |
| | 6,0 | 1,0 | 4,0 | 4,0 | 6,34 | 1,34 | (7,48) | 6,0 | 1,34 | 5,204 | 1,136 | 6,0 | 5,0 | 4,68 | 3,0 | 6,0 |
| | 5,0 | 6,102 | 3,0 | 3,0 | (7,48) | 5,51 | 3,51 | 4,0 | 4,68 | (7,217) | 6,153 | 4,0 | 4,0 | 6,102 | 1,0 | 3,0 |
| | 1,0 | 2,119 | 5,102 | 2,51 | 5,51 | (7,185) | 5,119 | 3,51 | (7,192) | 3,221 | 2,153 | 2,0 | 2,0 | 2,102 | 5,102 | 2,0 |
| | 2,51 | (7,153) | 2,187 | 6,136 | 3,119 | 3,187 | 6,153 | 5,179 | 5,204 | 6,238 | (7,192) | 1,0 | 3,102 | 1,136 | 6,153 | 1,0 |
| | 3,102 | 3,153 | 1,238 | 5,144 | 2,204 | 2,238 | 2,221 | 2,204 | 3,238 | 4,255 | 3,204 | 3,204 | 6,136 | (7,153) | 2,153 | 4,17 |
| | 4,119 | 4,221 | 6,255 | 1,255 | 4,255 | 6,255 | 1,255 | 1,238 | 6,255 | 1,255 | 5,238 | 5,220 | 1,255 | 3,153 | 4,255 | 5,144 |

Fig. 9

| Shape-mate Value (integer) | Direction Flags for | | | | Density Flags for | | | |
| --- | --- | --- | --- | --- | --- | --- | --- | --- |
| | S1 | S2 | S3 | S4 | S1 | S2 | S3 | S4 |
| 192 | 1 | 1 | 0 | 0 | 0 | 0 | 0 | 0 |
| 204 | 1 | 1 | 0 | 0 | 1 | 1 | 0 | 0 |
| Flag matches (True/False): | T | T | T | T | F | F | T | T |

*Fig. 10A*

| # Direction Flag matches | Total Direction Weight |
| --- | --- |
| 4 | 8 |

*Fig. 10B*

| # Density Flag matches | Total Density Weight |
| --- | --- |
| 2 | 2 |

*Fig. 10C*

| Nearness factor |
| --- |
| 10 |

*Fig. 10D*

| IP | SNF |
| --- | --- |
| 1 | 57 |
| 2 | 58 |
| 3 | 132 |
| 4 | 95 |
| 5 | 72 |
| 6 | 57 |

*Fig. 11A*

| IP | SNF |
| --- | --- |
| 3 | 132 |
| 4 | 95 |
| 5 | 72 |
| 2 | 58 |
| 1 | 57 |
| 6 | 57 |

*Fig. 11B*

PATTERN RECOGNITION APPARATUS AND METHOD

BACKGROUND OF THE INVENTION

1. Field of the Invention

This invention relates, generally, to keyless data entry devices. More particularly, it relates to a pattern recognition device and method for the rapid storage and retrieval of computer-based bit mapped images, such as signatures, based on their graphical content.

2. Description of the Prior Art

The Newton® handheld computer manufactured by Apple Computer, Inc., the EHT-30® handheld computer manufactured by Epson Corporation, and similar devices, enable a user to input data into a computer by writing on a screen. Software "reads" the data by comparing the information on the screen with patterns stored in the computer's memory.

The Newton has a MacIntosh®-like operating system, whereas the EHT-30® provides a touch-sensitive liquid crystal display screen to enable keyless data input.

The amount of memory employed in the Newton®, the EHT-30®, and similar devices is substantial; accordingly, considerable time (in an electronic sense) is required for the computer to search its memory in an effort to match the graphical design on its screen with a stored pattern. Moreover, the pattern-recognizing ability is somewhat limited in that handwriting that substantially deviates from standard handwriting cannot be recognized, i.e., the known systems are unable to effectively reject spurious data and image artifacts.

The known devices in this field also fail to harness the power of existing CPU instruction sets for both parallel and sequential architectures. Further, they work best with special computer languages and are difficult to implement with existing computer languages.

What is needed, then, is a keyless data entry device that makes effective use of existing CPU instruction sets, that rejects spurious data, that includes software that is easy to implement using existing computer languages, which has reduced mass storage requirements, and which performs its work much faster than existing devices.

Such a device would enable users to input into the memory or image database of the device a collection of user-drawn images, each of which may or may not be associated with text if desired by the user. These images, and accompanying text, if applicable, could then be recalled as needed by simply drawing the image on the screen of the device.

However, in view of the state of the art at the time the present invention was made, it was not obvious to those of ordinary skill in this art how the needed apparatus could be provided.

SUMMARY OF THE INVENTION

The longstanding but heretofore unfulfilled need for an apparatus that overcomes the limitations of the prior art is now met by a new, useful, and nonobvious device and pattern recognition method having utility with the Epson EHT-30® handheld computer.

A user of the inventive apparatus may elect to: 1) Save a user-drawn image in a computer memory in compressed numerical form; or 2) Retrieve a saved image from an image database that most nearly resembles a user-drawn image.

The steps of the novel method for both option 1) and 2) are the same for the first several steps, and then the steps diverge because option 2) requires additional steps. The steps common to both options include separating shapes in the user-drawn image from a background by determining the smallest square which completely encompasses all shapes while maintaining a relative distance relationship between each shape, transforming the smallest square into a target square of predetermined size, subdividing the target square into a plurality of smaller rectangles, subdividing each rectangle of said plurality of smaller rectangles into a plurality of sectors, scanning each sector of said plurality of sectors, assigning two binary values to each sector, a first binary value indicating whether or not graphical data is present in a sector and a second binary value indicating whether or not a sector contains at least a predetermined number of pixels that contain nonbackground data, forming a binary string by grouping together all of the binary values for each sector, forming a target list of said binary strings, forming a master list of sublists, said master list representing a map of interrelated binary strings for all images scanned and saved earlier, searching each of said sublists to locate a first item in each sublist having a value equal to or greater than a corresponding value in said target list, and preparing a list of index values where each index value represents an item in said sublists. The two options share no further common steps. The final step of the novel method, if the first option is selected, is to save the compressed numerical form of the user-drawn image by saving the list of binary strings into the sublists at positions specified by associated index values. If the second option is selected, the user-drawn image is not saved.

Where the second option is selected, a user-drawn image is scanned and the computer searches its memory to produce an image from an image database that most nearly resembles the user-drawn image. The novel steps include the following steps which are common to option 1) as recited above: Separating shapes in a target image drawn on a computer monitor screen from a background by determining the smallest square which completely encompasses all shapes while maintaining a relative distance relationship between each shape, transforming said smallest square into a target square of predetermined size, subdividing the target square into a plurality of smaller rectangles, subdividing each rectangle of said plurality of smaller rectangles into a plurality of sectors, scanning each sector of said plurality of sectors, assigning two binary values to each sector, a first binary value indicating whether or not graphical data is present in a sector and a second binary value indicating whether or not a sector contains at least a predetermined number of pixels that contain nonbackground data, forming a binary string by grouping together all of the binary values for each sector, forming a master list of said binary strings, forming a target list of sublists, said target list representing a map of interrelated binary strings for all images that were earlier scanned and saved, searching each of said sublists to locate a first numerical value in each sublist having a value equal to or greater than a corresponding value in said target list, and preparing a list of index values where each index value represents a numerical value in said sublists. At this point of the novel method, the steps for option 2) have been the same as the steps of option 1). The following steps are therefore unique to option 2): Creating a nearness list that contains one numerical value, having a predetermined value, for each image in an image database, each of said images in said image database being identified by a unique image pointer, generating a nearness factor by comparing the value of each binary string from the master list with a group of binary string values from the associated sublist in said map, saving each nearness factor in a nearness list that is indexed by means of the image pointer, and sorting the nearness list so that the first item in the list is most nearly identical to the target image and so that the last item in the list is the item before the first item having a null value relative to the target image. In this way, a list of image pointers and sum nearness factors is generated, and a pre-saved image in the image database that most nearly resembles the target image is identified by its image pointer. The image pointer is distinguished from among all other image pointers by its having a sum nearness factor greater than any of the other image pointers.

In other words, the novel structure includes a visual database that handles images drawn on the drawing area in two different ways: The drawn image may be saved to data files by the visual database (option 1); or the visual database finds an existing Image in the data files which most clearly resembles the user-drawn image (option 2). If desired by the user, the visual database also accesses text from the Text Editing Area that was originally saved with the image.

The user controls operation of the novel device from the Menu Area. Thus, the user can rapidly collect and edit complex data by simply drawing shapes on the Drawing Area which exist as images in the Visual Database.

It is a primary object of this invention to provide a pattern recognition process for rapid storage and retrieval of computer-based bit-mapped images based on their graphical content.

Another object is to accomplish the foregoing object by means of a device having minimal mass storage requirements and which therefore operates quickly.

These and other important objects, features, and advantages of the invention will become apparent as this description proceeds.

The invention accordingly comprises the features of construction, combination of elements and arrangement of parts that will be exemplified in the construction hereinafter set forth, and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE PREFERRED EMBODIMENT

Figure 1:
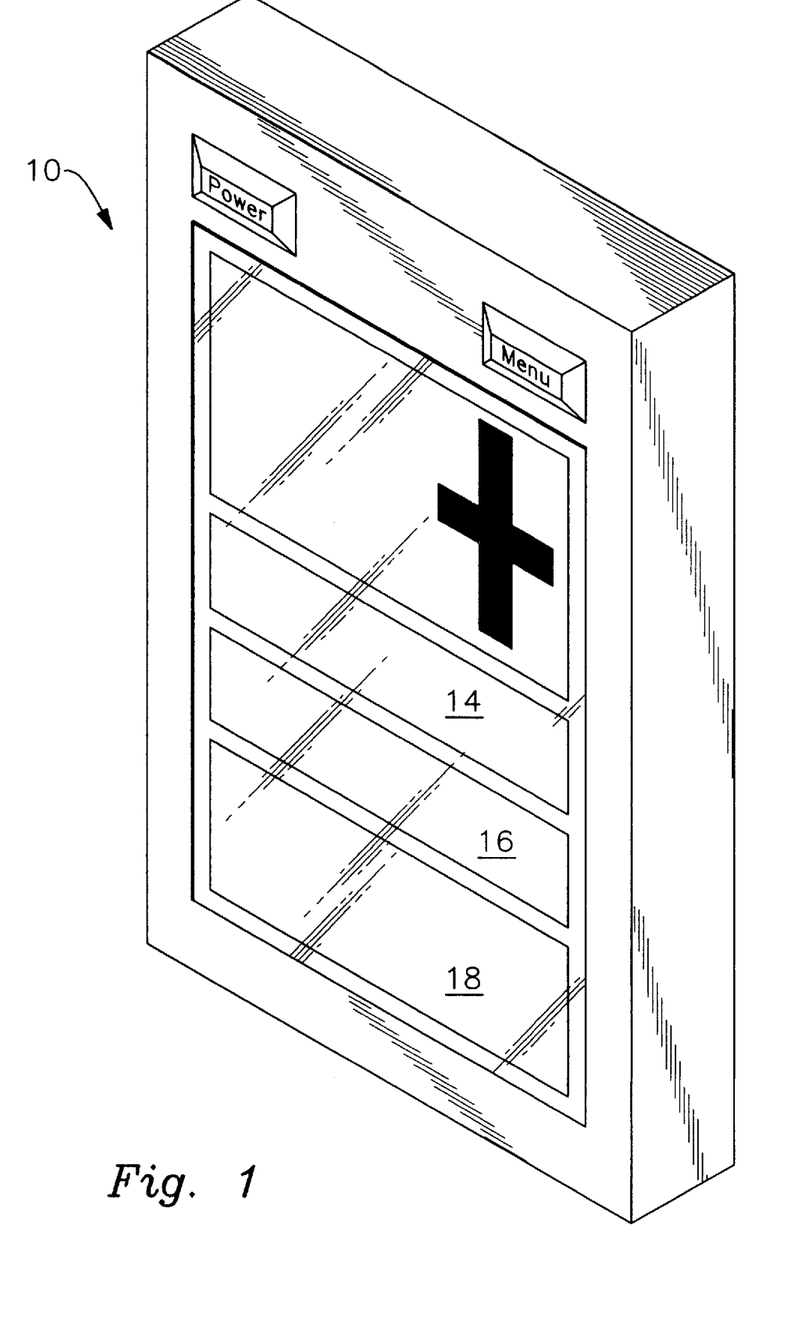
FIG. 1 is a front elevational view of a hand-held computer including a drawing area upon which an image has been drawn.

Referring now to FIG. 1, it will there be seen that an exemplary embodiment of the invention is denoted as a whole by the reference numeral 10.

Device 10 provides a graphical user interface for use with the ERT-30® handheld computer mentioned above; it includes four major sections, as follows: 1) a Drawing Area 12; 2) a Menu Area 14; 3) a Text Editing Area 16; and 4) a Customizable Keyboard Area 18.

A first option available to the user, that of saving a user-drawn image in the memory of the computer, is performed by a method including the steps of determining a Target Image, dividing the Target Image into a number of smaller rectangles, dividing the smaller rectangles into a number of sectors, maintaining a target list of sublists for each smaller rectangle, determining a value for each smaller rectangle, using that value as a target in a search of the sublists, finding the value for each smaller rectangle that is equal to or greater than a target value, compiling an index list, and saving the index list in the computer memory.

Calculating the Target Image

More particularly, the process of calculating a Target Image begins when a user draws on Drawing Area 12 of novel device 10. In FIG. 1, a user has drawn a cross; this image will be used to demonstrate how the novel invention "reads" the data represented by the cross. In the explanation that follows, the cross will be referred to as the Image. The Image is either saved in a Visual Database (first option), or the Image is not saved and an Image Database creates and returns a list of earlier-saved images that are most similar to the image drawn by the user (second option).

In both embodiments, the Shapes in the Image are separated from the background by finding the smallest square which completely encompasses all Shapes while maintaining the relative distance relationships between each Shape. The smallest square is hereinafter referred to as the Target Square.

The Target Square is calculated by finding the smallest rectangle, by suitable geometric scanning techniques, that completely encloses the portion of the Image which does not contain background data only. Such rectangle is hereinafter referred to as the Intermediate Rectangle and is denoted 20 in FIG. 2.

Figure 2:
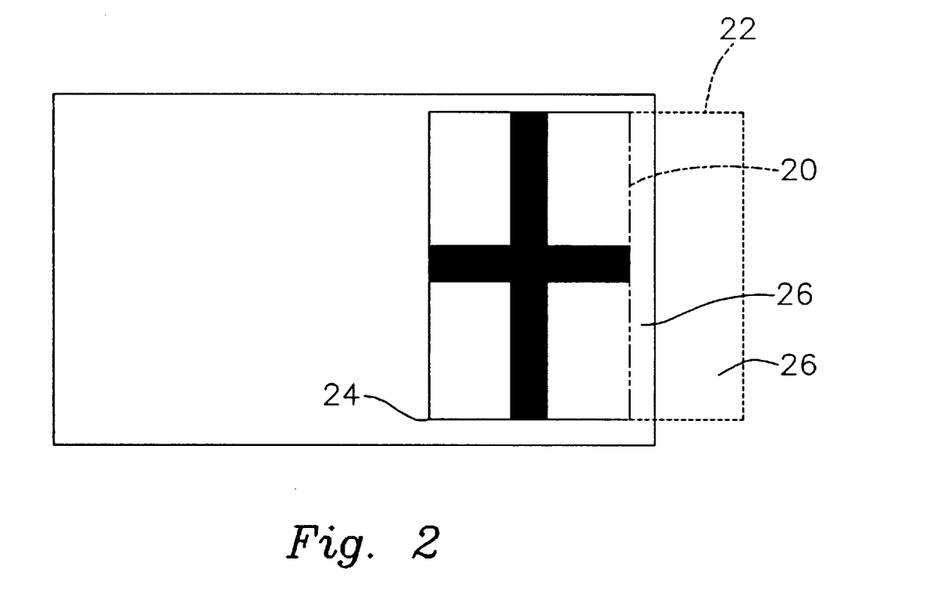
FIG. 2 is a front elevational view of the drawing area depicted in FIG. 1, and depicting an Intermediate Rectangle and a Target Square.

The longest side of Intermediate Rectangle 20 is used as the length of the Target Square's sides; the Target Square is denoted 22 in FIG. 2. A preselected corner, denoted 24 in FIG. 2, of Intermediate Rectangle 20 is used as the anchorpoint for Target Square 22. Every Target Square must use the same relative corner (lower left, lower right, upper left, or upper right) as a common anchor point for every Image in the Image Database.

Since Images often contain data that is not centered within the boundaries of the Image, the boundaries of one complete side of a Target Square may reside outside the boundaries of the Image, as depicted in the example of FIG. 2. Accordingly, the part of the Target Square that lies outside the Image is treated as being filled with background data. In FIG. 2, that part is denoted 26.

Figure 3:
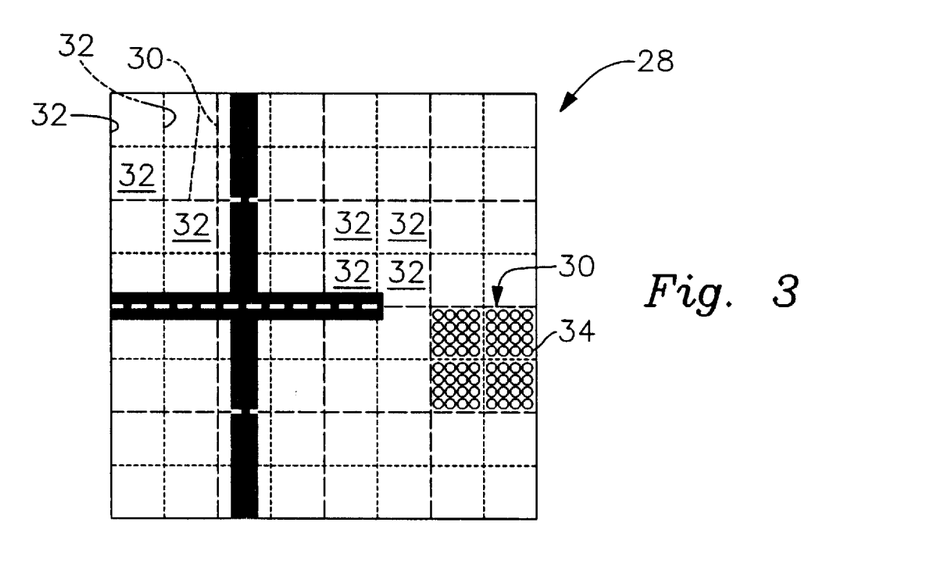
FIG. 3 is a front elevational view depicting the Target Square of FIG. 2 and further depicting the novel image subdivisions and sectors.

Target Square 20 is transformed into a square of predetermined size, using a standard geometric scaling transformation. It is then known as Target Image 28 (FIG. 3). The size of Target Image 28 must remain constant throughout all processing for a particular Image Database.

The transformation produces an image that accurately reflects the relative shapes and positions of the targeted graphical data, independent of the background, i.e., the produced image does not rely upon the original positioning of the Image within the Image boundaries.

Calculating the Shape-Mate List

As best understood in connection with FIG. 3, Target Image 28 is then subdivided into a number of smaller rectangles, hereinafter referred to as image subdivisions or Shape-mates 30. The number of Shape-mates may be any positive integer that allows the number of pixels contained within a Shape-mate to be greater than one (1) and less than the number of pixels within the Target Image. In the example of FIG. 3, there are sixteen (16) Shape-mates 30; the right-hand and lower borders of the first Shape-mate are indicated by a bifurcated lead line that extends from reference numeral 30.

Moreover, the number of image subdivisions (Shape-mates) must be constant for all Images in an Image Database. Good geometric scalability is achieved if each Shape-mate 30 contains the same number of pixels, but the novel method will work, less satisfactorily, if the number of pixels varies between Shape-mates. Although the number of Shape-mates can be preselected to fit a particular Image Database, multiples of four are best because use of such multiples meshes well with the overall geometric squaring that occurs throughout the steps of the novel processing, i.e., such multiples provide good "direction tracking" inherent in the Cartesian coordinate system.

Shape-mates 30 are further divided into a number of sectors; the sectors are denoted 32 in FIG. 3. Any number of sectors is acceptable as long as the number of pixels contained within a sector is greater than one (1) and less than the total number of pixels within the Shape-mate. The number of sectors, like the number of Shape-mates, may be preselected for a particular database, but multiples of four (4) are best to take advantage of the inherent qualities of the Cartesian coordinate system; in the example of FIG. 3, there are four sectors 32 in each Shape-mate 30. The ability to distinguish between similar Images improves as the number of sectors per Shape-mate increases, because the potential number of identical Shape-mate values within a sublist of Shape-mate values decreases as the size of each sector decreases.

Preferably, to provide good geometric scalability, each sector 32 should contain the same number of pixels. In the example of FIG. 3, sixteen (16) pixels, collectively denoted 34, are positioned within each sector 32 of a Shape-mate 30. The actual number of pixels would be much higher. Moreover, the number of sectors 32 must be constant throughout all of the Shape-mates 30 in an Image Database.

The sectors 32 of each Shape-mate 30 are then scanned for graphical data; any geometric scanning technique may be employed. Each Shape-mate sector 32 is then assigned two binary values; one of the binary values is a Data Present Flag (representing direction) and the other binary value is a Data Saturation Flag (representing density). If any amount of graphical data is detected within a sector, the Data Present Flag is assigned a value indicating a logical TRUE; if no graphical data is detected within a sector, the Data Present Flag is assigned a value indicating a logical FALSE.

Next, the number of pixels 34 within a sector 32 that contain nonbackground values are counted. If this number is greater than or equal to a predetermined amount (the Saturation Limit), the Data Saturation Flag is assigned a value indicating a logical TRUE; if said number is less than said predetermined amount, the Data Saturation Flag is assigned a value indicating a logical FALSE.

The Saturation Limit can also be preselected, i.e., adjusted to fit a particular Image Database. The purpose behind the adjusting is to locate a scalar threshold where the sector may be deemed "full" of data, or mostly full. The best value, as a general rule, is exactly half of the total number of pixels contained within the sector; this meshes well with principles of mathematical rounding.

Figure 4:
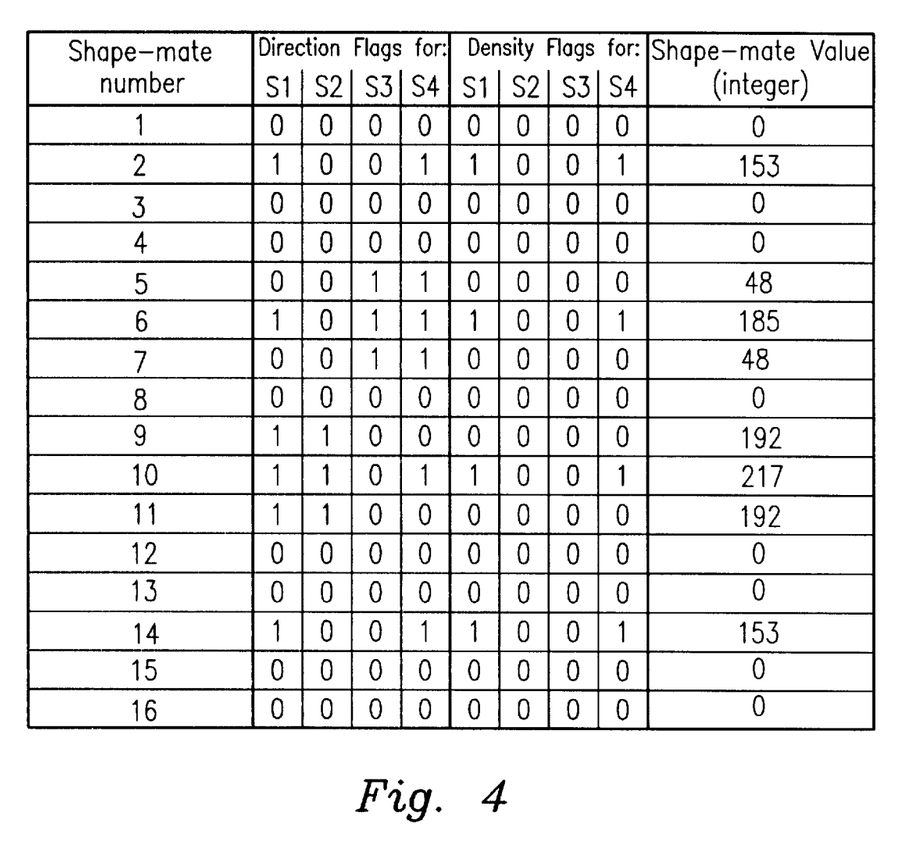
FIG. 4 is a table indicating how image subdivision values are calculated for the Target Image of FIG. 3.
Figure 5A:
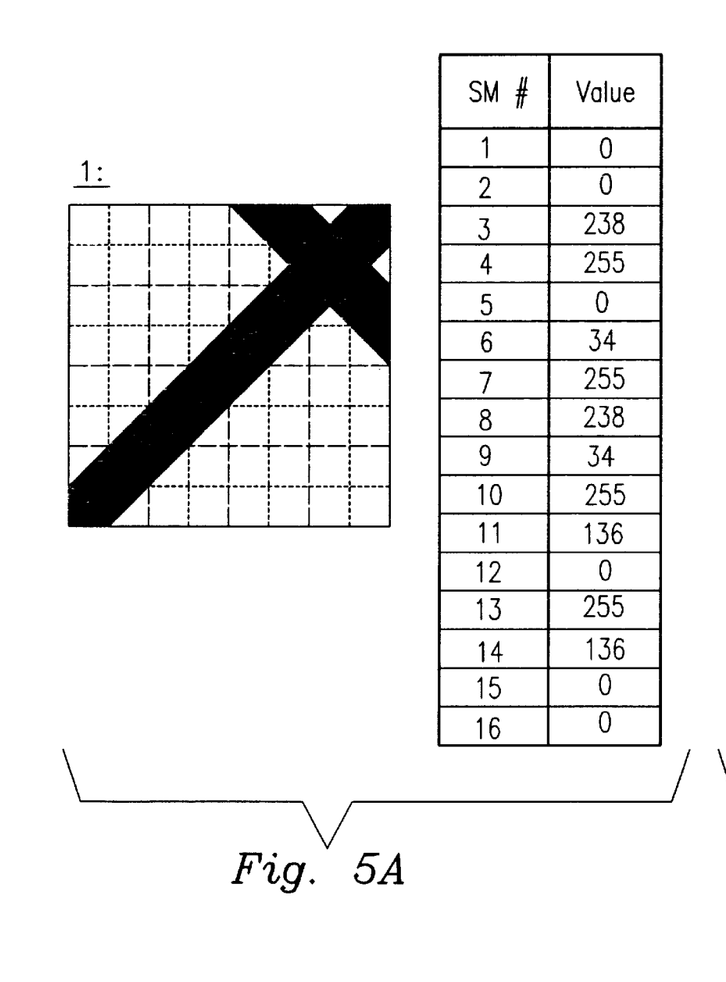
FIG. 5A depicts a first illustrative Target Image saved in an image subdivision map.
Figure 5B:
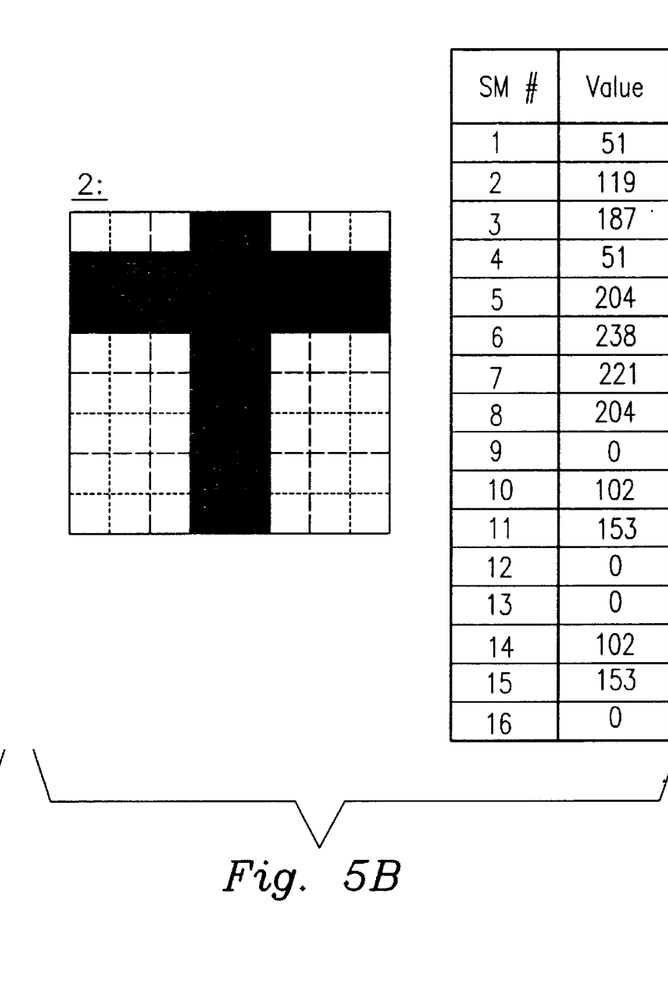
FIG. 5B depicts a second illustrative Target Image saved in an image subdivision map.
Figure 5C:
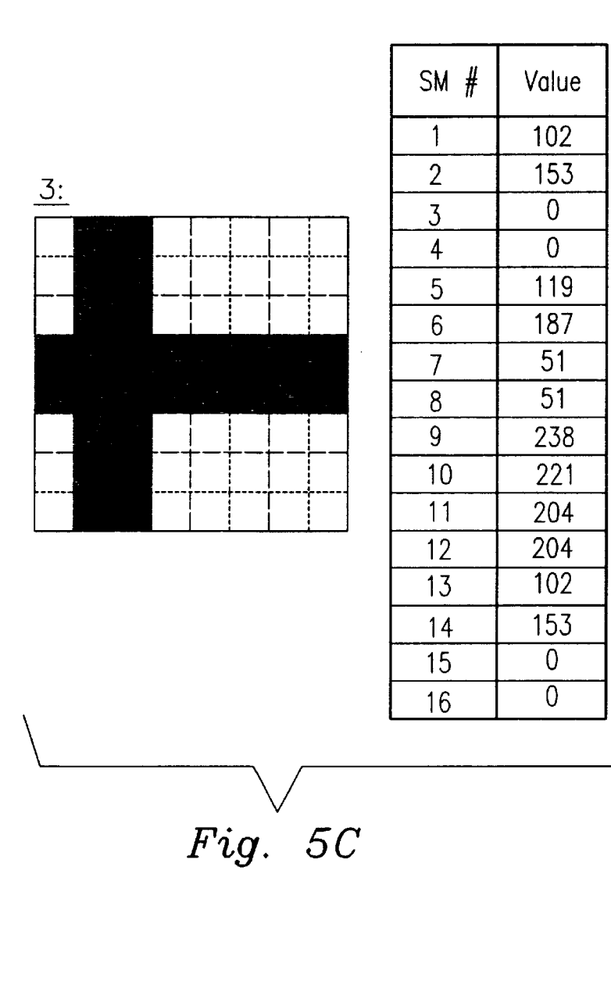
Fig. 5C depicts a third illustrative Target Image saved in an image subdivision map.
Figure 5D:
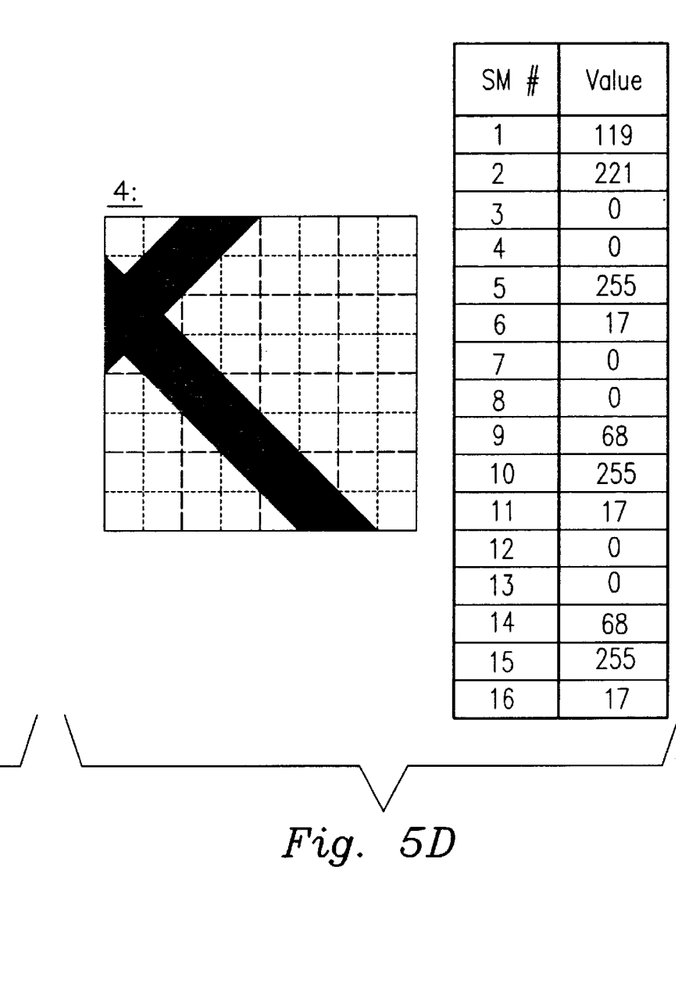
FIG. 5D depicts a fourth illustrative Target Image saved in an image subdivision map.
Figure 5E:
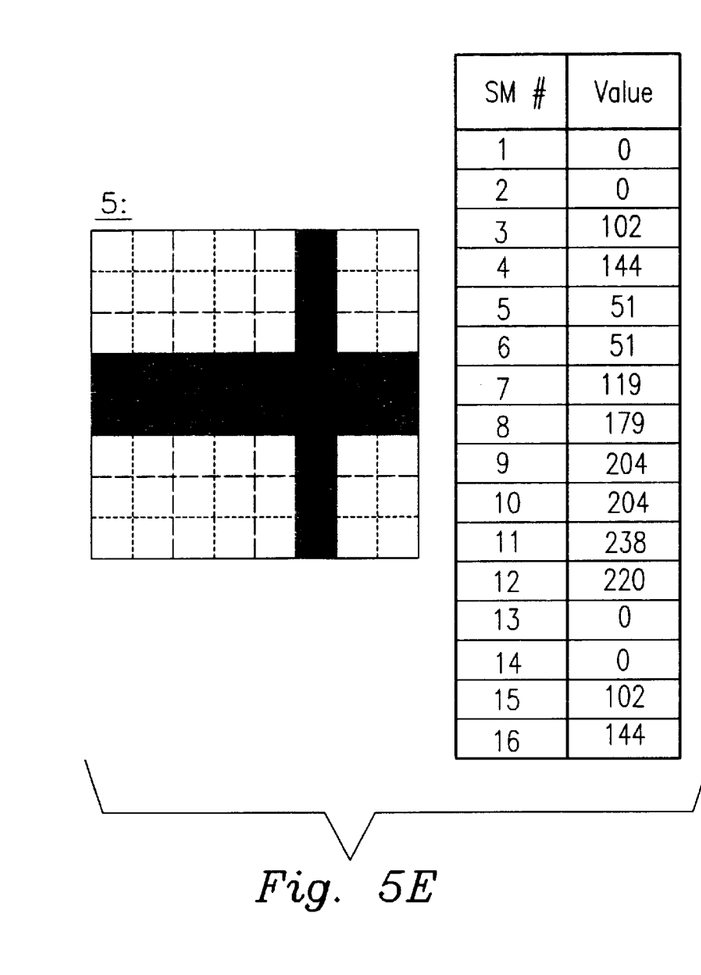
Fig. 5E depicts a fifth illustrative Target Image saved in an image subdivision map.
Figure 5F:
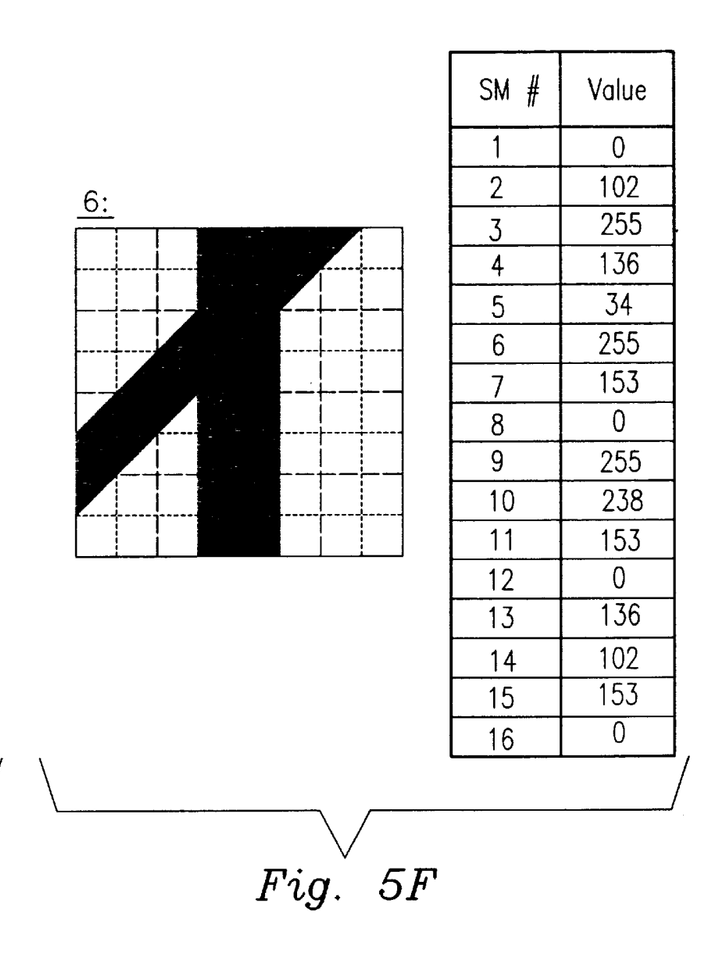
FIG. 5F depicts a sixth illustrative Target Image saved in an image subdivision map.

The Saturation Limit must be constant throughout an Image Database. The binary values for each sector 32 are then grouped together for each Shape-mate 30, thereby forming one binary string per Shape-mate; this binary string is called the Shape-mate Value or binary string value. FIG. 4 is a table indicating the Shape-mate Value for each of the sixteen sectors in the Target Image 28 of Fig. 3. The binary values for each sector may be grouped together by any suitable means at the user's preference, subject to the limitation that the grouping order must be uniform throughout all sectors in an Image Database. (The Image Database consists of user-drawn images that have been previously saved in the computer memory). As an example, suppose that in a particular Image Database, there are sixteen Shape-mates 30 and that each Shape-mate is further subdivided into four sectors 32, as in FIG. 3. Suppose that the Shape-mates 30 are numbered from left to right, beginning at the upper left hand corner of the Target Image 28, and that the sectors 32 are numbered in clockwise fashion, beginning in the upper left hand corner of each Shape-mate. In FIG. 3, Shape-mate number 10 (the second Shape-mate in the third row) contains the following sector values (which collectively form one Shape-mate Value):

> Sector (1) binary value = 11 +
> Sector (2) binary value = 10 +
> Sector (3) binary value = 00 +
> Sector (4) binary value = 11
> = Shape-mate Value: 1101 1001

The value "1101" indicates directions and "1001" indicates densities. In other words, at least some data is present in sectors 1, 2, and 4, and the amount of such data exceeds a predetermined threshhold in sectors 1 and 4. Only sector 3 lacks data entirely. The sectors 32 in the other Shape-mates 30 must be grouped in the same way if the Shape-mate Values are to have any utility, i.e., if the first direction values are added sequentially from (1) to (4) as in the example, followed by the density values, all other sectors in all other Shape-mates must be grouped in the same sequence. The table of FIG. 4 indicates the direction and density flags for all sixteen Shape-mates 30 for the Target Image 28 of FIG. 3.

Advantageously, when a multiple of four (4) is used for the total number of sectors, as in this example, the resulting Shape-mate values are convenient to process as bytes or words, thereby facilitating rapid processing using existing microprocessor instruction sets and thereby fulfilling one of the objects of this invention.

Figure 7:
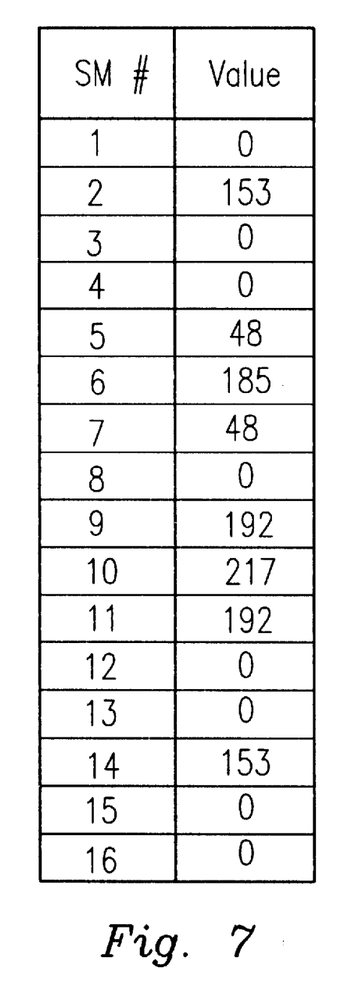
FIG. 7 is a table indicating the value of each image subdivision in the Target Image of FIG. 3.

Repeating this process for each sector 32 in each Shape-mate 30 results in a list of Shape-mate Values (see FIG. 4) that represents a compressed numerical form of the Target Image; accordingly, it is hereinafter referred to as the Shape-mate List. See the table of FIG. 7; it is formed by the first and last columns of the table of FIG. 4. The number of values in the list is equal to the number of Shape-mates in the Target Image. By saving the Shape-mate List into the sublists at positions identified by the index list, the user-drawn image is saved in compressed numerical form, and the novel method is completed if the user selected option 1).

As indicated in FIGS. 5A–F, a preselected number of Target Images are saved in a Shape-mate Map (FIG. 6) prior to saving (first option) or searching for (second option) the Target Image of FIG. 3. These Target Images are saved images that were input ealier by the user. A Shape-mate List is calculated for each Target Image as depicted. An Image Pointer or image identifier is associated with each Target Image; in this example, the Image Pointers are numbered one through six. Although a human eye can readily see that Image Pointer No. 3 represents a Target Image having the most resemblance to the user-drawn Image of FIG. 1, the computer must compare the values in the six (in this example) pre-stored Shape-mate Lists to the Shape-mate List of FIG. 4 to find the Shape-mate List that most closely approximates said Shape-mate list of FIG. 4.

Figure 6:
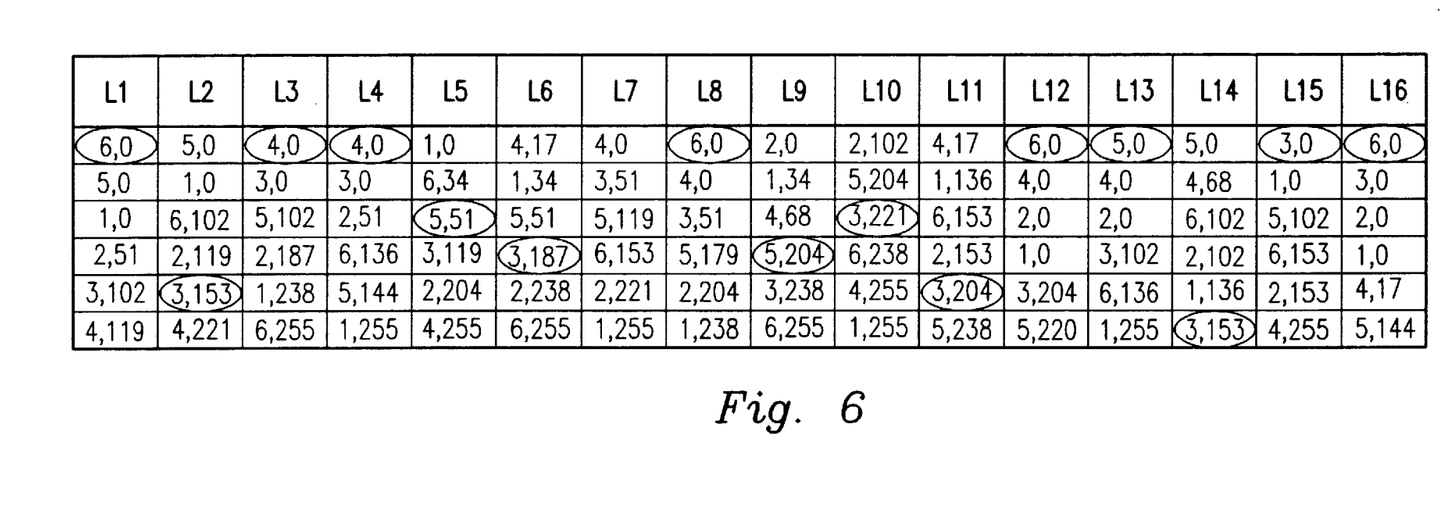
FIG. 6 is a table containing, in numerical form, each of the six images depicted in FIG. 5.

FIG. 6 is a Shape-mate Map containing the six images of FIG. 5 in compressed numerical form. It includes sixteen sublists, one for each Shape-mate per Target Image; the sublists are labled L1 through L16. Each sublist item contains two elements: an Image Pointer (image identifier) and a Shape-mate Value (or binary string value), and said two elements are separated from one another by a comma. Sublists may contain duplicate Shape-mate Values, but will not contain duplicate Image Pointers because each of the images of FIG. 5 is different. Sublist items that are found while generating a Shape-mate Index List, discussed below, are circled in FIG. 6. Sublist items found while selecting a group of Shape-mate Values for comparison to items in the Shape-mate List are shown in cross-hatched areas.

Calculating the Shape-Mate Index List

Each Shape-mate Value in the Shape-mate List (FIG. 7) is then used as a target in a search of an associated sublist in the Shape-mate Map (FIG. 6). The object of the search is to identify the first item in the sublist having a Shape-mate Value equal to or greater than the target Shape-mate Value. A Shape-mate Map is an internal database organized as a list of lists, i.e., as a target list of sublists. One Shape-mate Map is maintained for each Image Database, and there is one sublist for each Shape-mate. The sublists are organized within the target list by their respective Shape-mate's position within the Target Image.

The Shape-mate Map may also be thought of as a file of records of fields where each record is a list of items; this is ideal for implementing image-oriented filing systems.

As mentioned above, each element or item within a sublist includes two parts: 1) an Image Pointer; and 2) a Shape-mate Value. The Image Pointer is a data value that identifies, i.e., points at or indicates, the associated Image's actual position within the Image Database. Each sublist contains data from multiple Images, but from only one relative Shape-mate. The items in each sublist are arranged (sorted) in ascending order; the Shape-mate Value is used as the sort key. All Shape-mate Values are stored as strings of binary values, as explained above, so each Shape-mate Value is treated as a positive integer. Since the sublists are individually sorted by their Shape-mate Values, various searching methods may be used. A modified binary search is ideal to achieve rapid processing. If the item sought is found, the array index (position number) of the item within the sublist is retrieved. If a sublist item is not found, the array index of the final item on the array, plus one, is used.

Figure 8:
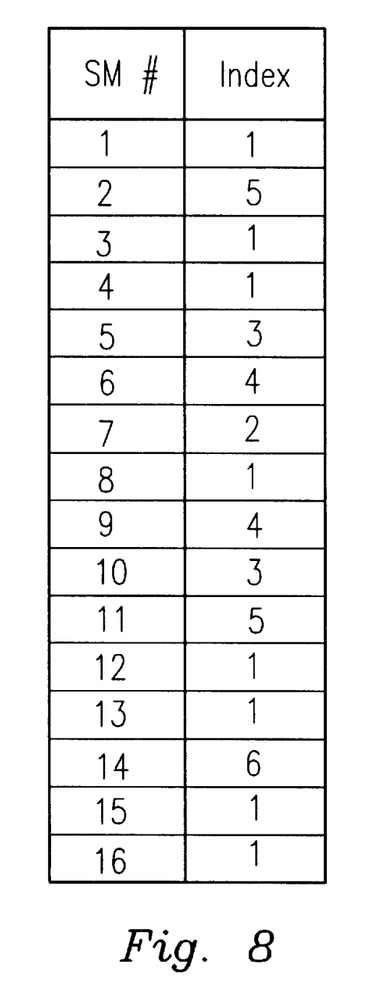
FIG. 8 is a table indicating the index number of each of said image subdivisions.

It is possible that many sublist items will share identical Shape-mate Values; all the Image Pointers will be different, however. It follows that the search must be able to find the first of many possible Shape-mate Value matches, ignoring the Image pointers, and if no exact match is found, to find the next highest value in the list. As each search is performed, the array indexes are collected in a Shape-mate Index List (FIG. 8). Each item in this list is an index value to the Shape-mate Map sublist for the associated Shape-mate Value in the Shape-mate List.

Note that the number of items in the Shape-mate Index List is equal to the number of items in the Shape-mate List.

Saving an Imaqe

In connection with the first option, as mentioned earlier, a user-drawn Image is saved in the Image Database. The position in the database where an Image is saved is used as the Image Pointer.

Thus, if a user initiates the steps of the novel method by pressing a button (not shown) to select the option of drawing an Image on the Drawing Area and then saving the Image in the Image Database, each Shape-mate Value in the Shape-mate List is inserted into its associated sublist in the Shape-mate Map at the index specified in the Shape-mate Index List. If the index is beyond the highest array item, i.e., the last item in the sublist, then the value is appended to the list.

Figure 9:
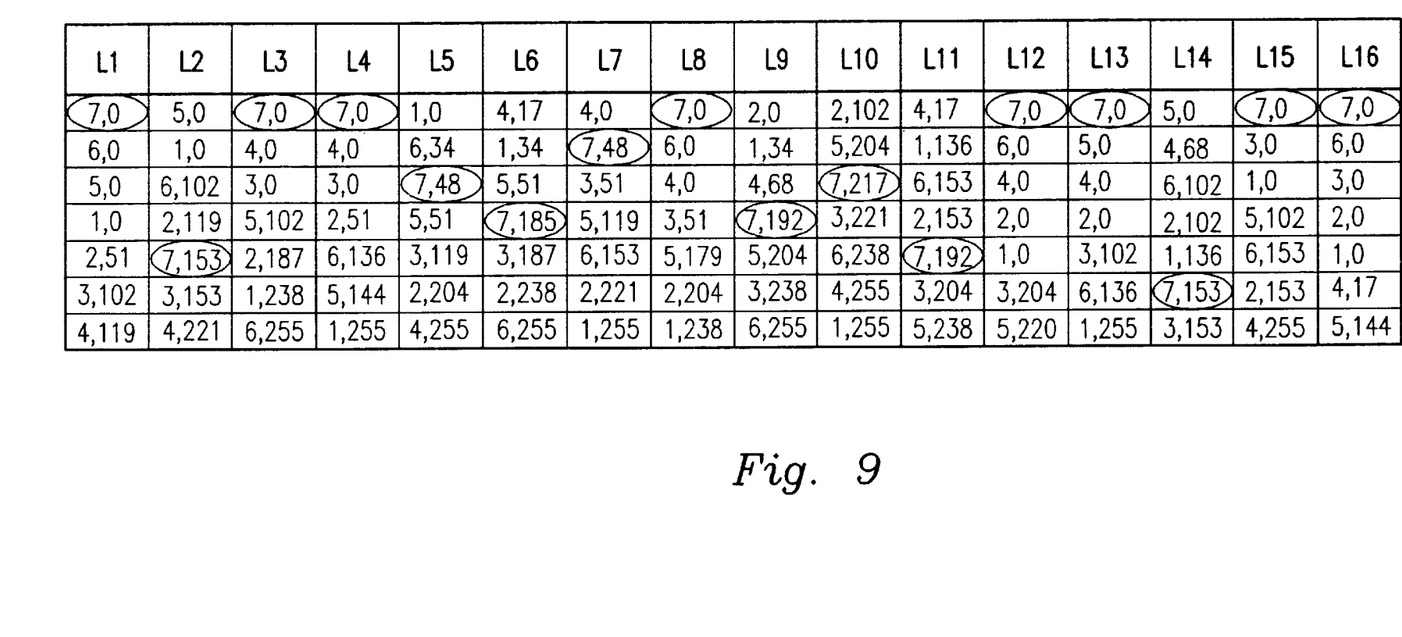
FIG. 9 is a table created by combining the respective contents of the table of FIGS. 4 and 6.
Figure 10A:
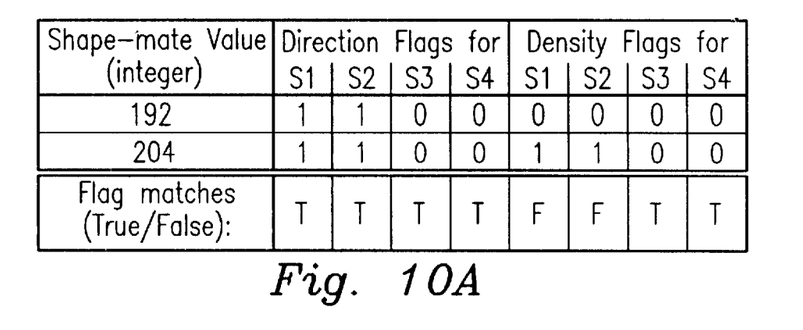
FIG. 10 is a table demonstrating how a Nearness Factor is calculated.
Figure 10B:
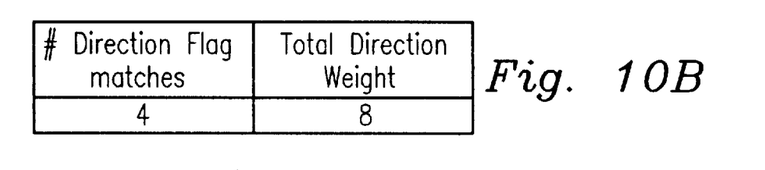
Figure 10C:
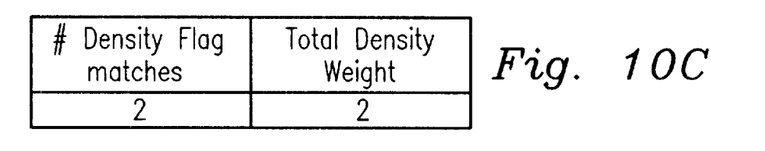
Figure 10D:
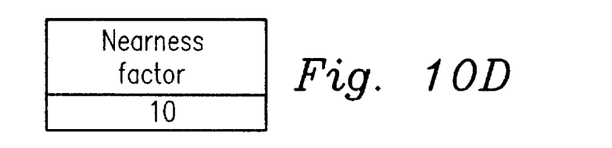

Moreover, the associated Image Pointer is also saved in the sublist, together with the Shape-mate Value. This results in an updated Shape-mate Map that includes one new Shape-mate Value, together with its associated Image Pointer, in each sublist. In this example, FIG. 9 is an updated Shape-mate Map; it represents the Shape-mate Map of Fiq. 6 after the addition thereto of the Shape-mate Values of the Target Image of FIG. 3. The new Image Pointer is "7" and the new Sublist items are circled. The updated Shape-mate Map contains all of the information about the added Images so that said information can be found later. The actual Image Data is also saved, in any format the user desires, directly into the Image Database.

Searching for an Image

If the user initiates the steps of the novel method not to save an image drawn by the user but, by pressing a button, not shown, to cause the novel device to search the Image Database for the Image drawn on the Drawing Area, the searching process commences with the creation of a list that contains one numerical value for each Image in the Image Database. This list is hereinafter referred to as the Nearness List. Each numerical value includes an Image Pointer and a positive integer hereinafter referred to as the Sum Nearness Factor; as its name implies, it represents accumulated Nearness Factors (defined below) relating the associated Image (drawn by the user) to the Target Image (already stored in the Image Database). The value of the Sum Nearness Factor must be initialized to a value of zero (0). The Image Pointer in each item, however, is initialized to the value of the numerical value's position within the Image Database at the time the list is created.

As an example, suppose an Image Database contains three (3) Images. Immediately after creation of the Nearness List, it contains three (3) items: {(1,0), (2,0), (3,0)}; the first value in each item is the Image Pointer (the number of the Image, i.e., 1=Image #1, 2=Image #2, etc.) and the second value is the Sum Nearness Factor.

Next, each Shape-mate Value in the Shape-mate List (see FIG. 7) is compared, one at a time, to a preselected group of Shape-mate Values from the associated sublist in the Shape-mate Map (FIG. 6).

A twelve step procedure governing the selection of the group of Shape-mate Values that are targeted for comparison is as follows:

1. Point to the respective first positions in the Shape-mate List and the Shape-mate Index List.

2. Get "Value 1" as the Shape-mate Value, from the current position in the Shape-mate List.

3. Get "Target Index" as the index into the Shape-mate Map Sublist, from the current position in the Shape-mate Index List.

4. Save the Target Index as the "Initial Target Index."

5. Run the following four step Compare Process:
   A. Set "Value 2" as the Shape-mate Value from the Shape-mate Map Sublist at the Target Index.
   B. Calculate the Nearness Factor between Value 1 and Value 2. (Note: When the Compare Process is called as a subprocess of procedure steps 6, 8, or 11, steps A. and B. may be skipped, since Value 1 and Value 2 are equivalent in those situations).
   C. Get the Image Pointer from the Shape-mate Map Sublist at the Target Index.
   D. Add the Nearness Factor into the Nearness List via the Image Pointer.

6. Increase the Target Index by one.

If Target Index is not past the end of the Sublist, and Value 2 is equal to the Shape-mate value from the Shape-mate Sublist at the new Target Index, then perform the four procedures of step 5 and repeat this step 6.

7. If Value 1 is equivalent to Value 2, and the Target Index is not past the end of the Sublist, perform the four procedures of step 5. If Value 1 is not equivalent to Value 2, go to step 9.

8. Increase the Target Index by one.

If Target Index is not past the end of the Sublist, and Value 2 is equal to the Shape-mate Value from the Shape-mate Map Sublist at the new Target Index, perform the four procedures of step 5 and repeat this step 8.

9. If the Initial Target Index is not at the beginning of the Sublist, then set the Target Index to the Initial Target Index minus one.

10. Perform the four procedures of Step 5.

11. Decrease the Target Index by one.

If Target Index is not before the beginning of the Sublist, and Value 2 is equal to the Shape-mate Value from the Shape-mate Map Sublist at the new Target Index, perform the four procedures of step 5 and repeat this step 11.

12. Point to the next highest positions in both the Shape-mate List and the Shape-mate Index list. If not past the end of the lists, go to step 2. If past the end of the list, the process is completed.

It should now be clear that a Nearness Factor is the result of a comparison of two Shape-mate Values. Each Nearness Factor is saved in a Nearness List; see Figs. 11A and 11B. The value of the Image Pointer associated with the Shape-mate Value in the sublist serves as an index into the Nearness List. Moreover, the result of each comparison is added to the Sum Nearness Factor of the indexed item; this results in a completed Nearness List, containing a list of Image Pointers with their associated Sum Nearness Factors. Next, the Nearness list is sorted, in descending order, using the Sum Nearness Factor as the sort key. The resulting list of Image Pointers is organized by their relative nearness to the Target Image, i.e., the first item in the list is the item most nearly identical to the Target Image, and each successive item is increasingly dissimilar to the Target Image. Thus, the last usable item in the Nearness List is the item before the first item having a Sum Nearness Factor of zero (0). When such item is identified, the searching process has ended, and user processing resumes.

Calculating the Nearness Factor

As mentioned above, the Nearness Factor is the positive integer result of a comparison of two Shape-mate Values. It will be recalled that Shape-mate Values are the combined binary values for all sectors in a Shape-mate; more particularly, Shape-mate Values are the combined binary values of the Data Present Flags and the Data Saturation Flags for each sector. Accordingly, as indicated in FIG. 10, the flags from a first Shape-mate Value are compared to the corresponding flags from a second Shape-mate Value. Each data flag that matches (whether the match is a FALSE—FALSE match or a TRUE—TRUE match), is assigned a positive integer value hereinafter referred to as a "weight." (No weight is assigned if two corresponding flags do not match). There are two distinct weights, i.e., one for the Data Present Flag and one for the Data Saturation Flag; the Weight assigned to the former should be greater than or equal to the Weight assigned to the latter. Both Weights must remain constant throughout an Image Database. The Nearness Factor is the sum of all Weights when comparing two Shape-mate Values.

The values appearing in FIG. 10 demonstrate the calculation of the Nearness Factor between Shape-mate number 9 from the Shape-mate list of FIG. 4 (which represents the Target Image of FIG. 3), and item number four from sublist L9 of the Shape-mate Map of FIG. 6. The Weight for the Direction (or Data Present) Flags is preset at "2" and the Weight for the Density (or Data Saturation) flags is preset at "1." This procedure provides a high-speed binary conversion from vector-oriented Shape-mate Values to scalar oriented Nearness Factors, thereby enabling creation of a Nearness List.

Figure 11A:
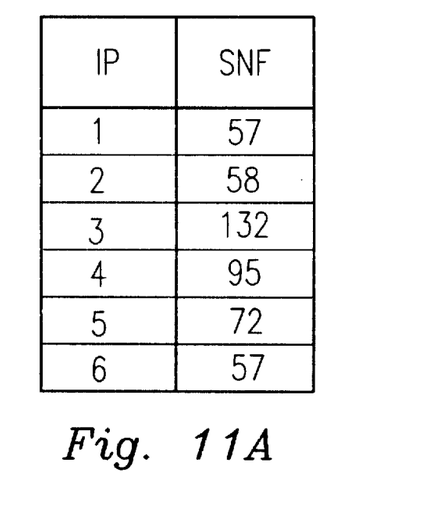
FIG. 11A is a table of a first Nearness List.
Figure 11B:
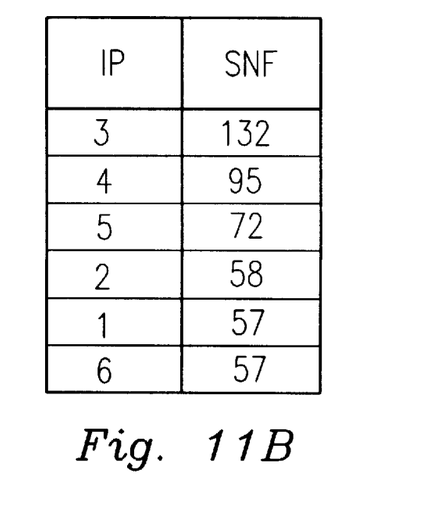
Fig. 11B is a table of a second Nearness List.

The Nearness Lists of FIGS. 11A and 11B are generated when searching the Shape-mate Map of FIG. 6 for images related to the Target Image of FIG. 3. Each list indicates the resulting Sum Nearness Factor (SNF), arranged by their respective Image Pointers. More particularly, Nearness List 1 of Fig. 11A shows the Nearness List upon completion of the last Sublist search of the Shape-mate Map, but prior to sorting. List 2 of Fig. 11B is the final list, sorted by Sum Nearness Factors. Such sorting yields a list of Image Pointers organized by their nearness to the Target Image.

Thus, the image in FIG. 5 which most nearly resembles the Target Image of FIG. 3 is referenced by Image Pointer 3. The next most similar image is referenced by Image Pointer 4, and so on.

This comparison procedure provides the best general purpose performance for all types of Images. User specific, secondary comparisons between Shape-mate Values may be performed, but such is discouraged because such secondary comparisons introduce Shape dependencies into the associated Shape-mate Map.

It will thus be seen that the objects set forth above, and those made apparent from the foregoing description, are efficiently attained and since certain changes may be made in the foregoing construction without departing from the scope of invention, it is intended that all matters contained in the foregoing construction or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,
What is claimed is:

1. A pattern recognition method for scanning and saving a user-drawn image, in compressed numerical form, in a computer memory, comprising the steps of:

separating shapes in said user-drawn image from a background by determining the smallest square which completely encompasses all shapes while maintaining a relative distance relationship between each shape;

transforming the smallest square into a target square of predetermined size;

subdividing the target square into a plurality of smaller rectangles;

subdividing each rectangle of said plurality of smaller rectangles into a plurality of sectors;

scanning each sector of said plurality of sectors;

assigning at least one binary value to each sector, said at least one binary value being assigned to denote a first preselected graphical quality of said sector;

forming a binary string by grouping together all of said binary values for each sector;

forming a target list of said binary strings;

forming a master list of sublists, said master list representing a map of interrelated binary strings, for a plurality of pre-scanned images;

searching each of said sublists to locate a first numerical value in each sublist having a value equal to or greater than a corresponding value in said target list;

preparing a list of index values where each index value represents an item in said sublists; and saving the compressed numerical form of the user-drawn image by saving said items from said target list in said sublists at positions identified by their respective index values.

2. The pattern recognition method of claim 1, wherein said at least one binary value indicates whether or not graphical data is present in a sector.

3. The pattern recognition method of claim 1, further comprising the step of assigning a second binary value to each of said sectors to indicate a second preselected graphical quality of said sector.

4. The pattern recognition method of claim 3, wherein said second binary value indicates whether or not a predetermined percentage of a sector is occupied by graphical data.

5. The pattern recognition method of claim 4, wherein said at least one binary value is given a weight greater than said second binary value.

6. A pattern recognition method for scanning and saving a user-drawn image, in compressed numerical form, in a computer memory, comprising the steps of:

separating shapes in said user-drawn image from a background by determining the smallest square which completely encompasses all shapes while maintaining a relative distance relationship between each shape;

transforming the smallest square into a target square of predetermined size;

subdividing the target square into a plurality of smaller rectangles;

subdividing each rectangle of said plurality of smaller rectangles into a plurality of sectors;

scanning each sector of said plurality of sectors;

assigning two binary values to each sector, a first binary value indicating whether or not graphical data is present in a sector and a second binary value indicating whether or not a sector contains at least a predetermined number of pixels that contain nonbackground data;

forming a binary string by grouping together all of said binary values for each sector;

forming a target list of said binary strings;

forming a master list of sublists, said master list representing a map of interrelated binary strings, for a plurality of pre-scanned images;

searchinq each of said sublists to locate a first item in each sublist having a value equal to or greater than a corresponding value in said target list; and preparing a list of index values where each index value represents an item in said sublists; and saving the compressed numerical form of the user-drawn image by saving said items from said target list in said sublists at positions identified by their respective index values.

7. A pattern recognition method, comprising the steps of:

separating shapes in a target image drawn on a computer monitor screen from a background by determining the smallest square which completely encompasses all shapes while maintaining a relative distance relationship between each shape;

transforming said smallest square into a target square of predetermined size;

subdividing the target square into a plurality of smaller rectangles;

subdividing each rectangle of said plurality of smaller rectangles into a plurality of sectors;

scanning each sector of said plurality of sectors;

assigning at least one binary value to each sector, said at least one binary value indicating whether or not graphical data is present in a sector;

forming a binary string by grouping together all of the binary values for each sector;

forming a target list of said binary strings;

forming a master list of sublists, said master list representing a map of interrelated binary strings for a plurality of pre-scanned and pre-saved images;

searching each of said sublists to locate a first item in each sublist having a value equal to or greater than a corresponding value in said target list;

preparing a list of index values where each index value represents an item in said sublists;

creating a nearness list that contains one predetermined numerical value for each image in an image database;

each of said predetermined numerical values in said image database being identified by a unique image pointer;

generating a nearness factor by comparing each index value from the target list with a group of values from the associated sublist in the map;

saving each nearness factor in a nearness list that is indexed by means of the image pointer;

sorting the nearness list so that the first item in the list is most nearly identical to the target image and so that the last item in the list is the item before the first item having a null value relative to the target image;

whereby a list of image pointers and sum nearness factors is generated;

whereby an image in said image database that most closely resembles the target image is identified by its image pointer; and whereby said image pointer is identified from among all other image pointers by its having a greater sum nearness factor than said other image pointers.

8. The pattern recognition method of claim 7, wherein said at least one binary value indicates whether or not graphical data is present in a sector.

9. The pattern recognition method of claim 7, further comprising the step of assigning a second binary value to each of said sectors to indicate a second preselected graphical quality of said sector.

10. The pattern recognition method of claim 9, wherein said second binary value indicates whether or not a predetermined percentage of a sector is occupied by graphical data.

11. The pattern recognition method of claim 10, wherein said at least one binary value is given a weight greater than said second binary value.

12. A pattern recoqnition method, comprising the steps of:

separating shapes in a target image drawn on a computer monitor screen from a background by determining the smallest square which completely encompasses all shapes while maintaining a relative distance relationship between each shape;

transforming said smallest square into a target square of predetermined size;

subdividing the target square into a plurality of smaller rectangles;

subdividing each rectangle of said plurality of smaller rectangles into a plurality of sectors;

scanning each sector of said plurality of sectors;

assigning two binary values to each sector, a first binary value indicating whether or not graphical data is present in a sector and a second binary value indicating whether or not a sector contains at least a predetermined number of pixels that contain nonbackground data;

forming a binary string by grouping together all of the binary values for each sector;

forming a target list of said binary strings;

forming a master list of sublists, said master list representing a map of interrelated binary strings for a plurality of pre-scanned and pre-saved images;

searching each of said sublists to locate a first item in each sublist having a value equal to or greater than a corresponding value in said target image;

preparing a list of index values where each index value represents an item in said sublists;

creating a nearness list that contains one predetermined numerical value for each image in an image database;

each of said predetermined numerical values in said image database being identified by a unique image pointer;

generating a nearness factor by comparing each value from the target list with a group of values from the associated sublist in the map;

saving each nearness factor in a nearness list that is indexed by means of the image pointer;

sorting the nearness list so that the first item in the list is most nearly identical to the target image and so that the last item in the list is the item before the first item having a null value relative to the target image;

whereby a list of image pointers and sum nearness factors is generated;

whereby an image in said image database that most closely resembles the target image is identified by its image pointer; and whereby said image pointer is identified from among all other image pointers by its having a greater sum nearness factor than said other image pointers.

* * * * *